US009235566B2

(12) United States Patent
Tinkler (10) Patent No.: US 9,235,566 B2
(45) Date of Patent: Jan. 12, 2016

(54) SYSTEM AND METHOD FOR ENHANCED LOOKUP IN AN ONLINE DICTIONARY (75) Inventor: Marc Tinkler, New York, NY (US)

(73) Assignee: THINKMAP, INC., New York, NY (US)

( * ) Notice: Subject to any disclaimer, the term of this patent is extended or adjusted under 35 U.S.C. 154(b) by 169 days.

(21) Appl. No.: 13/076,105

(22) Filed: Mar. 30, 2011

(65) Prior Publication Data
US 2012/0254802 A1 Oct. 4, 2012

(51) Int. Cl.
G06F 17/27 (2006.01)
G06F 17/30 (2006.01)

(52) U.S. Cl.
CPC ........ G06F 17/2735 (2013.01); G06F 17/3064 (2013.01); G06F 17/30731 (2013.01)

(58) Field of Classification Search
CPC . G06F 3/0237; G06F 17/276; G06F 17/2735; G06F 17/274; G06F 17/2795
USPC .......................................................... 715/816
See application file for complete search history.

(56) References Cited

U.S. PATENT DOCUMENTS

| 4,244,580 | A | 1/1981 | Hoyles |
| 4,775,956 | A | 10/1988 | Kaji et al. |
| 4,862,408 | A | 8/1989 | Zamora |
| 5,043,891 | A | 8/1991 | Goldstein et al. |
| 5,371,673 | A | 12/1994 | Fan |
| 5,537,317 | A | 7/1996 | Schabes et al. |
| 6,023,670 | A | 2/2000 | Martino et al. |
| 6,120,297 | A | 9/2000 | Morse, III et al. |
| 6,285,999 | B1 * | 9/2001 | Page |
| 6,529,864 | B1 | 3/2003 | Chase |
| 6,801,229 | B1 | 10/2004 | Tinkler |
| 6,918,097 | B2 | 7/2005 | Parisi |
| 7,010,751 | B2 * | 3/2006 | Shneiderman ................ 715/232 |
| RE39,090 | E * | 5/2006 | Beauregard et al. |
| 7,052,278 | B2 | 5/2006 | Johnson et al. |
| 7,101,185 | B2 | 9/2006 | Budra et al. |
| 7,130,861 | B2 | 10/2006 | Bookman et al. |
| 7,136,876 | B1 * | 11/2006 | Adar et al. |
| 7,177,797 | B1 * | 2/2007 | Micher et al. ...................... 704/9 |
| 7,489,819 | B2 * | 2/2009 | Sheets ........................... 382/186 |
| 7,647,345 | B2 | 1/2010 | Trepess et al. |
| 7,693,902 | B2 * | 4/2010 | Kim et al. ...................... 707/731 |
| 7,765,206 | B2 | 7/2010 | Hillis et al. |
| 7,840,893 | B2 | 11/2010 | Kulas |
| 7,853,544 | B2 | 12/2010 | Scott et al. |
| 7,890,886 | B2 * | 2/2011 | Matthews et al. ............. 715/809 |
| 8,001,120 | B2 * | 8/2011 | Todd et al. ...................... 707/736 |
| 8,255,417 | B2 * | 8/2012 | Nevill-Manning ............ 707/770 |

(Continued)

OTHER PUBLICATIONS

International Search Report and Written Opinion of the International Searching Authority in PCT/US2012/031184, report dated Jun. 22, 2012.

(Continued)

Primary Examiner — Alvin Tan
(74) Attorney, Agent, or Firm — Kenyon & Kenyon LLP (57) ABSTRACT A system and method predictively generates words based on a user input, according to a frequency of lookup of each of the generated words. The system and method also allows for a user to add predictively generated words to a word list that assists in the facilitation of word and vocabulary comprehension for a user. Words in the online dictionary are grouped in word families where a user can navigate between different forms of a root word.

21 Claims, 4 Drawing Sheets

(56) References Cited

U.S. PATENT DOCUMENTS

| | | | |
|---|---|---|---|
| 8,255,811 B2* | 8/2012 | Lynn et al. | 715/753 |
| 8,442,423 B1 | 5/2013 | Ryan et al. | |
| 8,491,311 B2 | 7/2013 | Bodner et al. | |
| 8,568,144 B2 | 10/2013 | Morrison et al. | |
| 2002/0103820 A1* | 8/2002 | Cartmell et al. | 707/500 |
| 2002/0107692 A1 | 8/2002 | Litovsky | |
| 2002/0115048 A1 | 8/2002 | Meimer | |
| 2003/0044760 A1 | 3/2003 | Banerjee et al. | |
| 2003/0050929 A1 | 3/2003 | Bookman et al. | |
| 2003/0060250 A1 | 3/2003 | Chan | |
| 2003/0152904 A1 | 8/2003 | Doty, Jr. | |
| 2003/0171949 A1* | 9/2003 | Degnan et al. | 705/1 |
| 2004/0073866 A1 | 4/2004 | Kunzel | |
| 2004/0189696 A1 | 9/2004 | Shirriff | |
| 2004/0259062 A1 | 12/2004 | Heller et al. | |
| 2004/0267607 A1 | 12/2004 | Maddux | |
| 2005/0004949 A1 | 1/2005 | Trepess et al. | |
| 2005/0037324 A1 | 2/2005 | Sumimoto | |
| 2005/0086188 A1 | 4/2005 | Hillis et al. | |
| 2005/0108001 A1 | 5/2005 | Aarskog | |
| 2005/0171760 A1 | 8/2005 | Tinkler | |
| 2005/0255438 A1 | 11/2005 | Manos | |
| 2006/0024654 A1 | 2/2006 | Goodkovsky | |
| 2006/0101012 A1* | 5/2006 | Carson et al. | 707/4 |
| 2006/0121432 A1 | 6/2006 | Sun | |
| 2006/0155528 A1 | 7/2006 | Higgins | |
| 2006/0161423 A1 | 7/2006 | Scott et al. | |
| 2006/0172276 A1 | 8/2006 | Higgins et al. | |
| 2006/0240394 A1 | 10/2006 | Smith et al. | |
| 2006/0240851 A1 | 10/2006 | Washburn | |
| 2006/0242576 A1* | 10/2006 | Nagel et al. | 715/535 |
| 2006/0277046 A1 | 12/2006 | Lachish et al. | |
| 2007/0011005 A1 | 1/2007 | Morrison et al. | |
| 2007/0050393 A1 | 3/2007 | Vogel et al. | |
| 2007/0072164 A1 | 3/2007 | Katsuyama et al. | |
| 2007/0112554 A1 | 5/2007 | Goradia | |
| 2007/0172808 A1 | 7/2007 | Capone | |
| 2007/0209004 A1 | 9/2007 | Layard | |
| 2007/0282826 A1* | 12/2007 | Hoeber et al. | 707/5 |
| 2008/0213020 A1 | 9/2008 | Kunzel | |
| 2008/0228906 A1* | 9/2008 | Yerubandi | G06F 17/30905 709/223 |
| 2008/0310723 A1* | 12/2008 | Manu et al. | 382/182 |
| 2008/0318200 A1 | 12/2008 | Hau et al. | |
| 2009/0030891 A1 | 1/2009 | Skubacz et al. | |
| 2009/0035733 A1 | 2/2009 | Meitar et al. | |
| 2009/0070111 A1 | 3/2009 | Bajaj et al. | |
| 2009/0094233 A1 | 4/2009 | Marvit et al. | |
| 2009/0098516 A1 | 4/2009 | Chiarelli | |
| 2009/0197225 A1 | 8/2009 | Sheehan et al. | |
| 2009/0253112 A1 | 10/2009 | Cao et al. | |
| 2010/0010977 A1 | 1/2010 | Choi et al. | |
| 2010/0035225 A1 | 2/2010 | Kerfoot, III | |
| 2010/0081120 A1 | 4/2010 | Nanjiani et al. | |
| 2010/0162168 A1* | 6/2010 | Lee et al. | 715/821 |
| 2010/0203492 A1 | 8/2010 | Nibe et al. | |
| 2010/0211896 A1* | 8/2010 | Brown | 715/764 |
| 2010/0273138 A1 | 10/2010 | Edmonds et al. | |
| 2010/0293162 A1* | 11/2010 | Odland et al. | 707/736 |
| 2011/0123967 A1 | 5/2011 | Perronnin et al. | |
| 2011/0125734 A1 | 5/2011 | Duboue et al. | |
| 2011/0136094 A1 | 6/2011 | Weiler | |
| 2011/0144978 A1 | 6/2011 | Tinkler | |
| 2011/0257961 A1 | 10/2011 | Tinkler et al. | |
| 2012/0053926 A1* | 3/2012 | Satpute | 704/8 |

OTHER PUBLICATIONS

Jonathan Brown et al., "*Retrieval of Authentic Documents for Reader-Specific Lexical Practice*," Proceedings of InSTIL/ICALL 2004, Symposium on Natural Language Processing and Speech Technologies in Advanced Language Learning Systems, Jun. 2004.

Jonathan C. Brown et al., "*Automatic Question Generation for Vocabulary Assessment*," Proceedings of HLT/EMNLP 2005, Human Language Technology Conference and Conference on Empirical Methods in Natural Language Processing, Oct. 2005, pp. 819-826.

Dan Gillick, "*Sentence Boundary Detection and the Problem with the U.S.*," Proceedings of NAACL HLT 2009, Annual Conference of the North American Chapter of the Association for Computational Linguistics: Human Language Technologies, Short Papers, Jun. 2009, pp. 241-244.

Ayako Hoshino and Hiroshi Nakagawa, "*A Cloze Test Authoring System and its Automation*," Proceedings of ICWL 2007, 6$^{th}$ International Conference on Web-based Learning: Advances in Web-based Learning, Aug. 2007, vol. 4823, pp. 252-263.

Wayne Porter, "*Amazon SIPs—SIPs are Statistically Improbable Phrases in Books and more*," posted Oct. 26, 2006, retrieved from http://www.wayneporter.com/?p=156 on Dec. 17, 2009, 7 pages.

Diego Puppin, "Inside Google Books: Explore a Bookin 10 Seconds," posted Jul. 1, 2009, retrieved from http://booksearch.blogspot.com/2009/06/explore-book-in-10-seconds.html on Dec. 17, 2009, 4 pages.

WordSift—Visualize Text Website, "*About*," "*Features*," "*Background Theory*," "*Word Lists*," "*Tips*," and "*Acknowledgments*" sections, retrieved from http://www.wordsift.com/ on Dec. 17, 2009, 19 pages.

Hakuta et al., "Wordsift: Using Computer-Assisted Language Learning to Increase ELs' Math and Science Literacy", Web Presentation for the National Clearinghouse for English Language Acquisition, Sep. 24, 2009, 18 pages, available at www.ncela.gwu.edu/files/webinars/13/Hakuta_Roman_Sep09.pdf.

Wientjes, Greg, www.wordsift.com, accessed Jan. 20, 2009, 7 pages.

Coxhead, Averil, "An Introduction to the Academic Word list," ELI Occasional Publication 18, Victoria, University of Wellington, New Zeland, 1998, pp. 1-9.

International Search Report and Written Opinion of the International Searching Authority in counterpart International Application No. PCT/US12/069174, 12 pages.

Yi-Chien Lin et al., "*An Automatic Multiple-Choice Question Generation Scheme for English Adjective Understanding*," Proceedings of the 15th International Conference on Computers in Education (ICCE 2007), Nov. 2007, pp. 137-142.

\* cited by examiner

SYSTEM AND METHOD FOR ENHANCED LOOKUP IN AN ONLINE DICTIONARY

FIELD OF THE INVENTION

The present invention relates to a system and method for querying a definition of a word in an online dictionary. The present invention further relates to a system and method for predictively looking up a word by generating a results display of words based on a partial user input. The present invention further relates to a system and method for combining words in an online interface into word families that represent different forms of a root word.

BACKGROUND INFORMATION

The convenience of online dictionaries is that they allow for a user to look up the definition of a desired word directly on the user's computer, without resorting to having to use a physical dictionary. A user can type a word into an online dictionary and a definition for that word can be generated and output to the user if the word exists (i.e., the word is a valid word). While previous implementations of online dictionaries have been useful, they are also antiquated. Previous online dictionaries require that a user search for a definition based on an input of an entire word. This can be problematic in instances in which the user does not know the entire word the user is looking up or does not know the actual correct spelling of the world. An incorrect spelling of a desired word usually results in no definition being generated for presentation to the user.

There may also be instances in which the user knows a definition that the user would like to convey, but does not know an applicable word for conveying that thought. Online dictionaries do not provide for a user to look up a word based on a definition or a partially known definition. Online dictionaries only allow for a user to input specific words to generate the output definitions.

There may also be instances where a user knows to use a variation of a given word, but the variation of the word is not defined by the online dictionary. For example, a user may have knowledge of the definition of a given verb, but may wish to use an adverb in a certain context. If a user inputs the adverb into an online dictionary, the user may instead get the definition of the root verb. The online dictionary may indicate to the user that an adverb may be formulated based on the root verb, but may not provide a definition for the adverb. For example, a user may want to know the definition of the adverb "knowingly." A user who enters "knowingly" into the online dictionary is given a definition for either the verb "know" or the adjective "knowing." Both the generated definitions of "know" and "knowing" may indicate to the user that an adverb "knowingly" may be formulated based on the words "know" and "knowing," but the online dictionaries do not provide a definition of "knowingly" nor allow the user to see how the word "knowingly" relates to the verb "know" and the adjective "knowing."

BRIEF DESCRIPTION OF THE DRAWINGS

FIG. 2 is a screenshot of a results display of an interface of an online dictionary program, according to an example embodiment of the present invention.

DETAILED DESCRIPTION

Example embodiments of the present invention provide an online dictionary that predictively looks up and generates a display list of words based on a partial input of a word by a user, or based on an input of a definition of a word.

Example embodiments of the present invention provide an online dictionary that combines words of an online dictionary into word families that allows a user to navigate between different variations of a root word.

Example embodiments of the present invention provide an online dictionary, in which a system and/or method predictively generates words based on a user input according to a frequency of lookup of each of the generated words. The system and method also allows for a user to add predictively generated words to a word list that assists in the enhancement of word and vocabulary comprehension for a user. In example embodiments, words in the online dictionary are grouped in word families where a user can toggle between different forms of a root word.

According to an example embodiment of the present invention, a system and method automatically generates for output a list of predictive words based on a user input, with each of the generated predictive words being ordered based on a frequency of lookup in a corpus of the online dictionary. Each of the predictive words displays may also be displayed with a primary definition of the generated predictive word.

According to an example embodiment of the present invention, a system and method may allow for a user to add to a word list a predictive word from the generated list of predictive words based on the user's input. Individual word lists may be made public or private, and a user may maintain multiple word lists.

According to an example embodiment of the present invention, a system and method may provide for a user to search for a word based on an advanced search function, where a user may search for a word and corresponding definition based on a part of speech, a synonym, an antonym, a definition, the beginning of a word, and other possible criteria. The system and method may further provide for the user to combine multiple search attributes.

According to an example embodiment of the present invention, a system and method may provide for words in the online dictionary to be combined into word families that represent variations of a given root word in the online dictionary. A user can navigate between different members of the word families to lookup meanings for other members of the word family.

Figure 1:
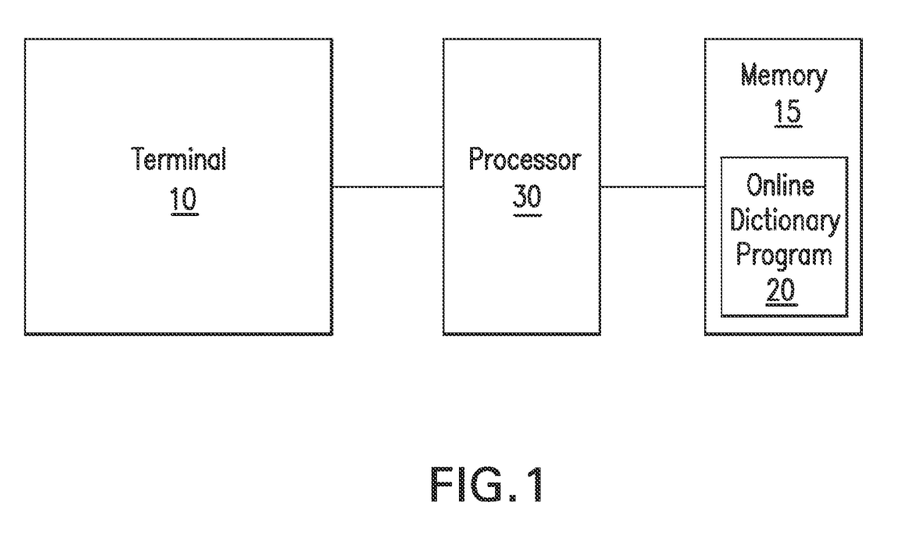
FIG. 1 is a block diagram of an online dictionary program, according to an example embodiment of the present invention.

FIG. 1 illustrates a diagram of a terminal 10 displaying a user interface of online dictionary program 20 stored in a memory 15, accessible by a processor 30, according to an example embodiment of the present invention. Online dictionary program 20 may be executed by processor 30 to display output on terminal 10. Terminal 10 may be a computer monitor, or any other display device which may depict output of online dictionary program 20 during execution.

Processor 30 may be implemented using any conventional processing circuit and device or combination thereof, e.g., a Central Processing Unit (CPU) of a Personal Computer (PC) or other workstation processor, to execute code provided, e.g., on a hardware computer-readable medium including any conventional memory device, to perform any of the methods described herein, alone or in combination. Processor 30 may also be embodied in a server or user terminal or combination thereof The components of FIG. 1 may be embodied in, for example, a desktop, laptop, hand-held device, Personal Digital Assistant (PDA), television set-top Internet appliance, mobile telephone, smart phone, etc., or as a combination of one or more thereof. The memory 15 may include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to one or more hardware computer-readable media, e.g., as described above, having stored thereon instructions executable by processor 30 to perform the methods described herein.

An example embodiment of the present invention is directed to a method, e.g., of a hardware component or machine, of transmitting instructions executable by processor 30 to perform the methods described herein.

Various methods and embodiments described herein may be practiced separately or in combination.

Online dictionary program 20 may contain a comprehensive list of words, with each word having a primary definition and may also contain additional definitions for the given word. A primary definition for a word may correspond to the most frequently used meaning of a given word. The "frequency of use" for a given word may be determined by analyzing the use of a word in a corpus of sentences from obtained text. In example embodiments, the obtained text may be content retrieved from online sources.

In an example embodiment, online dictionary program 20 may obtain text from existing Internet content sources. For example, a server for online dictionary program 20 may be subscribed to web content syndication (RSS) feeds, such as RDF Site Summary, Rich Site Summary, or Really Simple Syndication feeds, of major newspapers and periodicals, and may use text from such feeds to determine a most frequently used definition of a given word.

Internet articles obtained, for example from RSS feeds, typically take the form of a Hyper Text Markup Language (HTML) document. In an example embodiment of the present invention, the system and method parses the HTML document into an eXtensible Markup Language (XML) Document Object Model (DOM), which may be examined to determine how often a specific word appears in the obtained text, e.g., to determine a "frequency of appearance" of each of the words, where the words are counted for all instances in which they appear, for all definitions of the word.

The system and method may also provide for determining how often a word is used in the corpus of the online text using a particular definition of the word. A determination by the system of how often of a word is used in the context of a particular definition, may constitute the frequency of use for that specific definition of the word. A definition that has a highest frequency of use for a word, i.e., the word appears most often in the corpus of sentences with that definition of the word, may be set as the primary definition of the word.

FIG. 2 is a screen shot of an example interface of online dictionary program 20, according to an example embodiment of the present invention. A user may input a partial input, e.g., including one or more characters, into an input search field 100, generating a results display list 110 as shown in FIG. 2, e.g., corresponding to words that begin with the input characters. The words listed in display list 110 may correspond to words most likely to be looked up by the user based on the partial user input. Words most likely to be looked up may be determined by the "frequency of lookup" for definitions of the words starting with the input characters.

A frequency of lookup may be determined for every word in online dictionary program 20. The system and method of the present invention may record and maintain a count for every instance a user enters a string matching a given word, i.e., a user looks up a given word. The frequency of lookup for each word may be stored in the system and may be updated every time the designated word is looked up.

When a user inputs a partial input into the search field 100, the results display list 110 generated may display words beginning with the partial input of the user. The system and method of the present invention may be configured to display words with the highest frequency of lookup at the top of the generated list. In an example embodiment, the results display list 110 may output the most frequently looked up words in descending order, with the word with the highest frequency of lookup listed at the top of results display list 110. Results display list 110 may be a scrollable list, with only a portion of the list, e.g., a predetermined fixed number of words at a time, being displayed to the user at a given time. Alternatively, the system may be configured to display at any one given time as many words as fit into an area designated for display of the list of words, the size of which area may depend on the amount of other information to be provided in other sections of the interface as described below. A user may scroll down through the list to display the words having been less frequently looked up than those initially displayed. As the user scrolls down the list, additional words may be obtained and displayed dynamically, corresponding to the next most frequently looked up words, until the user reaches the end of the list and has exhausted all possible words beginning with the partial input. The words at the bottom of the result display 110 may correspond to the words that have the lowest frequency of lookup.

Each of the words in the results display list 110 may be displayed along with a primary definition for the word. The primary definition may be displayed adjacent to the word as illustrated in FIG. 2.

For example, the results display list 110 may visually display five words at a time, based on the user input into search field 100. The top four words on the list may correspond to the four words with the highest frequency of lookup that start with the user input. The word with the highest frequency of lookup may be at the top of results display list 110, and the word with the second highest frequency of lookup may be displayed second on the results display list 110, immediately beneath the word with the highest frequency of lookup. The word with the third highest frequency of lookup may be displayed in the results display list immediately beneath the word with the second highest frequency of lookup. The word with the fourth highest frequency of lookup may be displayed immediately beneath the word with the third highest frequency of lookup. If a user scrolls down through the results display list 110, the next most looked up words may be obtained and displayed to the user.

For example, referring to the interface illustrated in FIG. 2, a user may input a word starting with the letter "n" into search field 100. After the letter "n" has been input to search field 100, results display list 110 may be generated. The word "naïve" may be displayed at the top of results display list 110. In this example, the word "naïve" may represent the word with the highest frequency of lookup for words that begin with the letter "n." The word "nostalgia" may be displayed below "naïve" and may represent the second most looked up word that begins with the letter "n." The word "niche" may be displayed below "nostalgia" and may represent the third most looked up word that begins with the letter "n," whereas the word "nostalgic" may represent the fourth most looked up word that begins with the letter "n" and may be displayed below "niche" in results display list 110.

Results display list 110 may include a separate section for display of a word based on an alphabetical sort. The section may be displayed, for example, beneath the list of words that are sorted based on look-up frequency. For example, in FIG. 2, the section appears immediately beneath the first four listed words, and contains a fifth visually displayed word that may be displayed to the user. The system and method may alphabetically sort the words stored in the system, and the word, e.g., the fifth word in the illustrated interface, that is included in the second section of results display list 110 may be one that most closely matches the user partial input based on the alphabetical sort. In the example where a user inputs the letter "n" into search field 100, the system and method may output a word in the results display that is closest alphabetically to the input letter. In this instance, this may correspond to the $14^{th}$ character of the Roman alphabet "n," which is alphabetically identical to the partial input by the user. In an example embodiment, if a user scrolls through result display 110, the system may dynamically change the words displayed in the first section at the top of results display list 110, e.g., the first four displayed words, but may leave the word displayed in the second section, e.g., the fifth word, corresponding to the closest alphabetic match, unchanged.

When a user inputs an additional character into input search field 100, the results in result display 110 may be dynamically updated. Results display list 110 may correspond to new words that begin with the new partial input and the words listed in display list 110 may correspond to words most likely to be looked up by the user based on the new user input, and the word being a closest match, by alphabetic sort, to the new partial word string. The new words presented in results display list 110 may be displayed adjacent to their primary definition.

Results display list 110 may output the most frequently looked up words containing the new user input in descending order, with the word with the highest frequency of lookup for the new user input listed at the top of results display list 110. A user may again scroll down through the list, with words in descending order of frequency of lookup, until the user reaches the bottom of the result display 110 which corresponds to the words that have the lowest frequency of lookup for the new user input.

In an example embodiment of the present invention, where the words of the first section, e.g., the top four words, of the results display list 110 correspond to the most frequently looked up words with the new user input, these four words may change each time the user inputs another letter or character into search field 100. The word with the highest frequency of lookup for a new user input may be output to the top of results display list 110, with the subsequent highest frequency lookup words for the new user input listed consecutively below it. A word of the second section of the results display list 100, e.g., the fifth displayed word, may be the word that most closely matches the new user input alphabetically. When a user scrolls through results display list 110, the words of the first section, e.g., the first four displayed words, may change to the next most frequently looked up words with the new user input, while the word of the second section, e.g., the fifth displayed word, may remain the same.

For example, where a user has already input the letter "n" into search field 100, the letter "o" may be subsequently input. Input search field may now contain the string "no." Results display list 110 may be generated for this string, which will be updated from the previous results display list for the letter "n." The word "naïve," previously output by the system as the most looked up word starting with the letter "n," may no longer be listed in results display list, as "naïve" does not begin with the string "no." The word "nostalgia," which was previously the second most frequently looked up word beginning with the partial input "n," may now be the most frequently looked up work beginning with the string "no." The word "niche" may also be removed from the results display list 110, as the word does not begin with the string "no." "Nostalgic" may now be the second most frequently looked up word for the inputted string "no" and may be displayed below "nostalgia" in results display list 110.

New words may be generated and visually displayed under "nostalgia" and "nostalgic" for the third and fourth most frequently looked up words beginning with "no." Additionally, a new word may be output for the fifth visually displayed word, corresponding to a word that most closely matches the new user input. In this example, the string "no" has now been entered into search field 100, the system and method may output a new word that is closest alphabetically to the string. Presumably, in this case, the adverb "no," meaning a function word to express the negative of an alternative choice or possibility, which is alphabetically identical to the new input by the user, may be displayed as the fifth visually displayed word in results display list 110. If a user scrolls through result display 110, the first four words visually displayed at the top of results display list 110 may dynamically change to the next four most frequently looked up words. The fifth visually displayed word, corresponding to the closest alphabetic match of "no," may remain the same as the input by the user has not changed since entering the letter "o" into search field 100.

The system and method may dynamically change results in result display 110 every time an additional character is inserted into input search fields 100, where the additional character causes a change to the list of most frequently looked up words and/or the closest alphabetically matched word. Results display list 110 may dynamically change to display new words that begin with the changed user input most likely to be looked up, and visually displayed word that most closely matches the input alphabetically.

In an example embodiment of the present invention, the system and method may display the full definition of the most frequently looked up word for a user input in definition area 120 of the interface of online dictionary program 20. Area 120 may list the most frequently looked up word and a complete primary definition of the word and alternate definitions of the word, as well as a part of speech of the word. Definition area 120 may also provide for a paragraph which explains the definition, etymology, and the usage examples in which the most frequently looked up word may be used. The interface of online dictionary program 20 may also visually display a listing 150, displaying in reverse chronological order, the most recent sentences from the corpus of sentences from obtained text from the online sources using the most frequently looked up word. In an example embodiment, only three of the most recent sentences are shown, but the user may hit "Next" for the display of another set of three sentences, each new set moving further back in time, or the user may alternatively scroll through such sentences, new sentences being dynamically retrieved for populating the listing 150. In an example embodiment, as the system receives new feeds, the system may automatically and dynamically update the display to show the most recent sentences, without regard to user input.

The system and method may output filter controls for filtering the sources of the sentences in listing 150. For example, the sources may be filtered to be limited to only news sources, medicine or science sources, sports sources, business sources, art or culture sources, fiction sources, or technology sources. As words may be used differently in various sources, allowing the user to filter the sources may help the user understand how to use the word in a relevant context.

In an example embodiment of the present invention, the various displayed result display 110 may be user-selected, in response to which selection, the system may update the definition area 120, the listing 150, and a word family box 140, described below to include information pertaining to the selected word, rather than information pertaining to the most frequently looked-up word.

In an example embodiment of the present invention, in response to a user input scrolling instruction, to scroll the list of words of result display 110, such that the most frequently looked up word is no longer displayed in the result display 110, the system may update the information of the other sections of the interface to that corresponding to the most frequently looked up one of the words that remain displayed in the result display 110.

In an example embodiment of the present invention, the system may provide in the interface an "Add to list" button 130, e.g., displayed adjacent to the definition area 120, in response to selection of which the system may add the most frequently looked up word to a word list (described below). According to the example embodiment in which words of the result display 110 may be selected, if the user does select a word of the result display 110 other than the most frequently looked up word, the system may, in response to the selection of the "Add to list" button 130, add the selected word to the word list.

A user may also be provided a word family box 140 that may be displayed in the interface of the online dictionary program 20, e.g., adjacent to listing 150 and definition area 120. Word family box 140 may display the most frequently looked up word as well as words in the word family that may be related to the most frequently looked up word. A word family may include a root word and words stemming from the root word, such as words that contain an prefix or suffix affixed to the root word. A user may navigate between the different members of the word family displayed in word family box 140 and the related words, to look up the related words.

Figure 3:
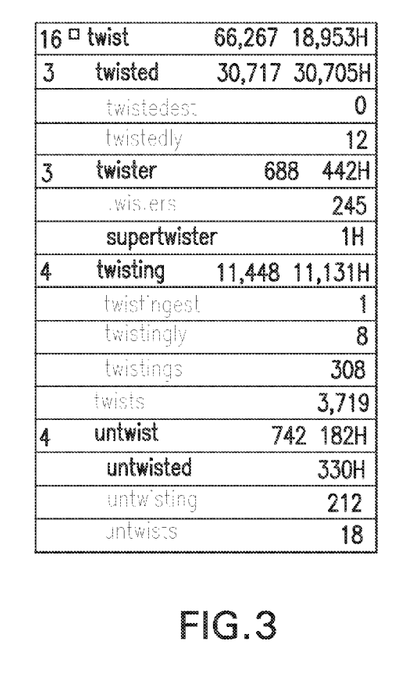
FIG. 3 is an internally generated tree of an example word family, according to an example embodiment of the present invention.

The system and method may generate a word family for each root word. FIG. 3 shows an internally generated tree of a word family generated for the root word "twist," which may be used to make a word family box 140 for each of the words related to the root word. A root word may be listed at the top of the tree, as evidenced by FIG. 3, where the root word "twist" is listed at the top of the tree. Directly underneath the root word, each "child" may be listed as a node of the parent root word. A child of the root word may include any word that includes only one prefix or suffix affixed to root word. In the example for the root word "twist," the words "twisted," "twister," "twisting," and "untwist" may constitute children of the root word.

One or more, e.g., each, of the immediate children in the word family may have their own children, which may be grandchildren of the root word. The grandchildren may descend directly from the nodes corresponding to the immediate children of the root word. The grandchildren may include words that include another prefix or suffix to a word that already includes one prefix or suffix appended to the root word. For example, the words "twistedest" or "twistedly" may be children to the word "twisted" and grandchildren to the root word "twist." Similarly, the words "untwisted," "untwisting," and "untwists" may be children to the word "untwist" and grandchildren to "twist." Subsequently, one or more, e.g., each, of the grandchildren may have children, which may be great-grandchildren to the root word, and so on. This may be repeated, e.g., until offshoots of the root word are exhausted.

If any of the words in the tree have any descendents (including children, grandchildren, great-grandchildren, etc.), a number may be recorded, as shown listed to the left of the word in the tree; this number may include the number of words in the group including the respective word and all of its descendents. For example, in FIG. 3, the root word "twist" has fifteen descendents in the root tree, and thus the number 16 may be listed in association with the word in the tree. The frequency of appearance of each word may also be recorded in association with the words of the tree, as shown listed next to the word in the tree, representing the number of times the word exactly appears in the corpus of obtained online text. The frequency of appearance of each word combined with the frequency of appearance of its descendents may also be recorded in association with the word, as shown listed next to the words in the tree, representing the number of times that either the word or its descendents appear in the corpus of obtained online text. For example, the word "untwist" may appear itself in the corpus of online text 182 times. Since its children "untwisted," "untwisting," and "untwists" also appear in the corpus, the tree may indicate that "untwist" and all its descendents appear 742 times in the corpus. The system may use the information regarding frequency of use as described, for example, in U.S. patent application Ser. No. 13/075,973, entitled "System and Method for Generating Questions and Multiple Choice Answers to Adaptively Aid in Word Comprehension," the entire contents of which is hereby incorporated herein by reference. In an alternative example embodiment, the system may record the number of times of use of the combination of a word and its children up to a predetermined number of hierarchical levels removed from the respective word. Alternatively, the usage number may be based on other hierarchical organizations of the word families not shown in FIG. 3.

Words of the tree that are listed, and for which a definition is provided, in online dictionary program 20 may be considered "headwords." The system may record which words of the tree are headwords, such words being shown in FIG. 3 marked with the letter "H." Examples of headwords for the root word twist are "twist," "twisted," "twister," "supertwist," "twisting," "untwist," and "untwisted." In many cases, headwords may be the root word and its immediate children, although in some cases (such as "supertwister" and "untwisted" shown in FIG. 3), grandchildren and other descendents may be headwords.

Figure 4:
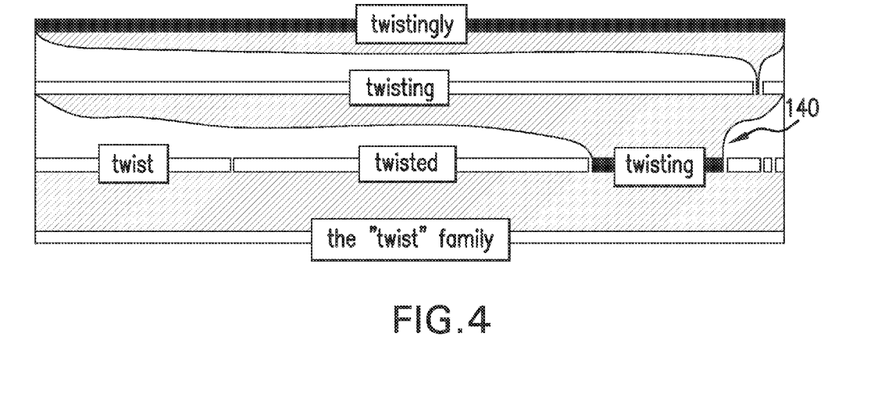
FIG. 4 is a screenshot of a displayed word family in the online dictionary program, according to an example embodiment of the present invention.

FIG. 4 shows a screen shot of a displayed word family box 140 in the interface of the online dictionary program 20 for the "twist" family. Word family box 140 may illustrate the word family which is being displayed. For example, in FIG. 4, word family box 140 may show that the "twist" word family is illustrated. Word family box 140 may illustrate different and distinct levels according to the tree structure in FIG. 3. A highest level may display the selected or looked up word at that level. At the subsequent next highest level, if the selected word has a parent, i.e., it is not a root word, the parent of the selected word may be represented, e.g., displayed and/or otherwise, along with all of the children of that parent. The children represented may include the selected word. For example, the second level of FIG. 4 shows the word "twisting" and also includes a representation of the word "twistingly." If the selected word is a grandchild, the grandparent of the select word may be represented, e.g., displayed, at the next highest level thereafter, along with the children (the selected word's parent and aunts and uncles) of the grandparent. Additional levels may be displayed for earlier ancestors (great-grandparents, etc.).

For example, in FIG. 4, the word "twistingly" may be displayed at the highest level (here, the third level) of word family box 140. The word "twistingly" is a child of the parent word "twisting." Therefore, the word "twisting" may be represented, e.g., displayed, at a level below the word "twistingly" at the second level. The second level may include representations of, e.g., display, the parent word "twisting" along with its children "twistingly," "twistingest," and "twistings." Since "twistingly" is a grandchild of root word "twist," a lowest level may be displayed containing representations of the root node "twist" and its children "twisted," "twister," "untwist," and "twisting," the last being the parent of the selected word "twistingly."

Each level may be depicted by a bar that is divided into sections corresponding to each respective word at the respective level. In instances where only one word appears at a level, for example the word "twistingly" at highest level in FIG. 4, a single uniform bar may be displayed for the level. In an example embodiment of the present invention, the system may be configured to, for each level, base the respective percentages of the bar allocated for representation of the respective words of the level on the respective frequency of appearance for each exact word (as opposed to the combination of frequencies of the word and its descendents) in the level, as recorded in the tree represented in FIG. 3. If a word displayed in a given level has a low frequency of appearance in contrast to the other words in the level, the portion of the bar allocated for that word may be extremely small, so that the represented word is not displayed. For example, in FIG. 4, not all of the children for the words "twisting" in the second level and "twist" in the first level are displayed in their representative sections of the respective bars.

In an example embodiment, in response to selection of a word, the system and method may highlight the portion of the bar corresponding to the selected word and the bar portions corresponding to the parent of the selected word. In FIG. 4, the bar portion corresponding to the word "twistingly" is highlighted in the first and second levels, along with the bar portions of its parent word "twisting" in the third level. For example, all portions representing the selected word may be highlighted, and, for each of the ancestors of the selected word, the bar portion representing the ancestor at the highest hierarchical level, e.g., the lowest displayed bar, may be highlighted. For a selected word, the system may display a graphic showing a connection of each active graph portion to the active graph portion of the bar of the higher hierarchical level, e.g., in the form of a call-out type graphic, as shown in FIG. 4.

A word may be selected by selecting, e.g., via a point-and-click, a representative bar section of the word family box 140 or via interaction via any other section of the interface. For example, selection may be by input of the word in the input search field 100 and subsequent selection of a "look it up" button, or by selection of one of the words of the result display 110. The top listed word of the result display 110 may initially be considered selected by default. According to an example embodiment, when the user scrolls the listed words, so that the top word in display changes, the remaining sections of the interface, including the word family box 140 may be correspondingly and dynamically changed.

In an example embodiment of the present invention, an intellisense feature may be provided to notify a user how often a word appears. A user may hover a pointer above a portion of a bar, and the system and method may output the frequency of appearance of the word corresponding to that portion of the bar. The system may refer to the relevant recorded information described above with respect to FIG. 3 for output of the frequency. The system and method may also convert the frequency of appearance information to other types of information, such as how often a word appears per some predefined limit, i.e., number of words of obtained online text. For example, if a word appears 3,000 times in a corpus of 100,000 words, the system may output a ratio of 3/100. In an alternative example embodiment, the system may output the frequency as the number of times the word appears on a given page of text, e.g., the word "twisting" will appear on average once every 50 pages. For example, the system may be programmed with an equivalency of a certain number of words to a page, and may convert the number of times a word appears in a corpus of words to a page. Alternatively, the system may analyze page breaks and/or other page demarcations of received data, on the basis of which analysis the system may output expected frequency of words per page.

A user may navigate between the different members of the word family displayed in word family box 140 to look up the related words, by clicking on other words in the word family. In response to selecting, e.g., clicking, a bar portion corresponding to a different word than that which is currently selected, the system may change the layout of word family box 140, where the newly selected word may be listed at the highest bar level, and lower bar levels may correspond to the parent, grandparents, and earlier ancestors, if any, of the newly selected word. Word family box 140 may help a user understand a word by seeing the various forms of the word, how they relate to each other, and the relative frequencies of their use.

When a user selects a word from the results display list 110, the full definition of the selected word may be displayed in definition area 120. In this instance, definition area 120 may list the selected word, a complete primary definition of the word, alternate definitions, and a part of speech of the word. Definition area 120 may also include a paragraph which explains the definition, etymology, and the usage examples in which the selected word may be used. Definition area 120 may only provide for the display of a definition of a headword. If the selected word is a headword, definition area 120 may display the primary definition of the selected word. In an embodiment, where the selected word is not a headword, the system and method may search up the hierarchy for the parent of the lowest hierarchical level according to the generated tree structure described with respect to FIG. 3, that is a headword. The system may display in definition area 120 the definition of the headword identified by the system.

As noted above, word family box 140 may display a word family of a selected word in accordance with the hierarchical relationships of the internally generated tree for the word family. Listing 150 may also display the most recent sentences from the corpus of sentences from obtained text from the online sources using the selected word. A user may also add the selected word to a word list via button 130. When a user selects a word from the generated results display list 110, the system and method may record that the user looked up the selected word, and the frequency of lookup for the selected word may be incrementally increased by one. Similarly, in response to selection of the "look it up" button, the system may increment the look-up frequency of the word in the input search field 100, if the string within the input search field 100 is a valid word. In other example embodiments, other types of user selections, e.g., via the interface shown in FIG. 2, may instead or additionally cause the system to increment the recorded look-up frequency of the respective word.

Figure 5:
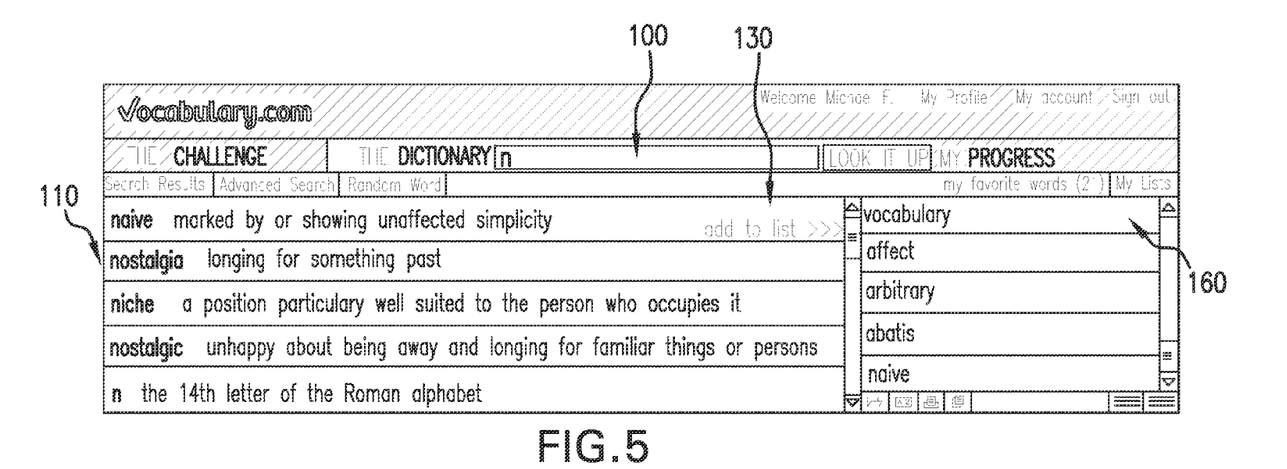
FIG. 5 is a screenshot of an interface of an online dictionary program, when a word is being added from a results display list, according to an example embodiment of the present invention.

A user may also add any of the words from results display list 110 to a user-specific word list stored in association with a particular user. Such a word list is described, for example, in U.S. patent application Ser. No. 13/075,973, entitled "System and Method for Generating Questions and Multiple Choice Answers to Adaptively Aid in Word Comprehension,". The user-specific word list may contain words that the user may be trying to learn. FIG. 5 is a screen shot of an example interface of online dictionary program 20 when a word is being added from results display list 110 to word list 160. Word list 160 may be made public or private, and may commented on by an individual. If a word list is made public, public comments may be made on the words list. If a word list is made private, only the user may comment on the word list. A user may make more than one word list, but all users may have at least one default word list. A user may select the word list of the user to which to add the word, or if no word list exists, create a new word list.

If a user hovers the pointer over a word in the results display list 110, a link allowing the user to add the word to word list 160 may be displayed, as shown in FIG. 5. The displayed link may perform the same functionality described with respect to button 130. Clicking on the link or using a keyboard shortcut may allow for the user to add the word to the word list. The user may scroll through results display list 110 and add additional words in the results display list 110 to word list 160.

Figure 6:
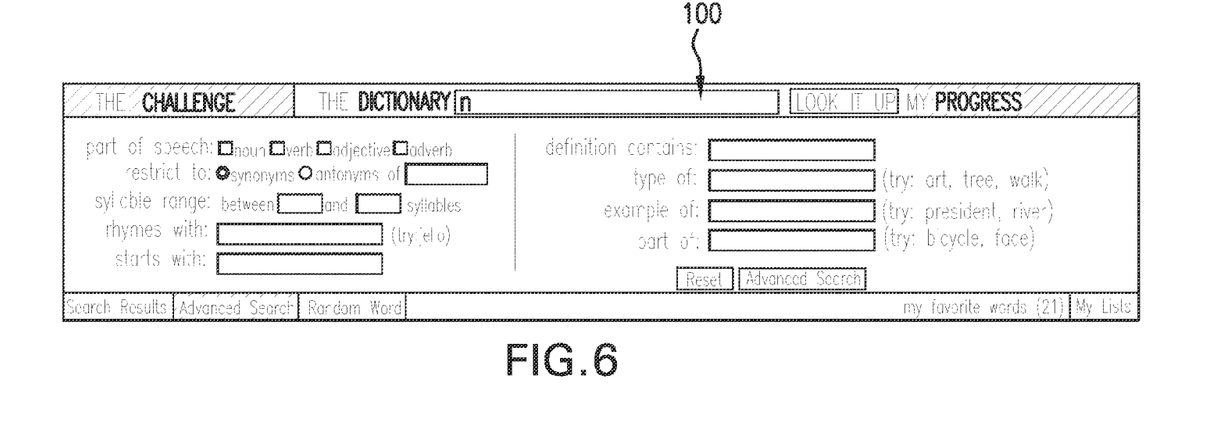
FIG. 6 is a screenshot of an interface of an online dictionary program using an advanced search function, according to an example embodiment of the present invention.

The system and method of the present invention may also include an advanced search function that may allow for a user to look up a word but restrict the search of the word to those conforming to selected attributes. FIG. 6. is a screen shot of an interface of an online dictionary program using the advanced search function. A user may click on the "Advanced Search" tab on the interface of online dictionary program 20. The "Advanced Search" tab may be located above results display list 110, as depicted in FIGS. 2 and 3. By selecting specific attributes, the system and method may return words in results display list 110 that have been filtered in accordance with the selected attributes. In an example embodiment, a user may change the attributes in the advanced search function before a user input is input into search field 100. Alternatively or additionally, a user may enter an input into search field 100 first, and then select the specific attributes.

In an example embodiment of the present invention, a user may restrict the part of speech for the words generated in results display list 110. For example, the "Advanced Search" tab may include checkboxes for a noun, a verb, an adjective, and an adverb. A user may check one or more of the part of speech boxes to restrict the generated words in results display list 110 to the desired part(s) of speech.

In an example embodiment of the present invention, a user may restrict the generated words in results display list 110 to be a synonym or an antonym of a certain word input in the "Advanced Search" tab. Radio buttons may be selected to indicate whether the search is to be restricted to a synonym or an antonym. A user may select to restrict the search to a synonym or an antonym, and may input a word into an input field indicating the word of which the returned results are to be synonyms or antonyms.

In an example embodiment of the present invention, a user may restrict the generated words in results display list 110 to those that include a number of syllables that is within an input range. For example, the "Advanced Search" tab may include an input field for a user to set a lower limit of the range and an input field for setting a higher limit of the range.

In an example embodiment of the present invention, a user may restrict the generated words in results display list 110 to rhyme with an input word. The "Advanced Search" tab may include an input field for a user to enter a word to rhyming words of which the results are restricted.

In an example embodiment of the present invention, a user may restrict the generated words in results display list 110 to words starting with a particular prefix or characters. The "Advanced Search" tab may include an input field for a user to enter characters that will restrict the results to words that begin with the input prefix or characters.

In an example embodiment of the present invention, a user may restrict the generated words in results display list 110 to words having a particular definition. The "Advanced Search" tab may include an input field for a user to enter a partial definition, or a string that may be found in a definition, that will restrict the results to words that have a definition that contains the input words.

In an example embodiment of the present invention, a user may restrict the generated words in results display list 110 to words that are of a particular type or category. For example, a user may restrict the results to words that of the category "art" or "tree" as shown in FIG. 6. The "Advanced Search" tab may include an input field for a user to specify a designated type category of which returned results must be. For example, where the user inputs "art" into the input field, results display list 110 may contain such generated words as "picture" or "painting."

In an example embodiment of the present invention, a user may restrict the generated words in results display list 110 to words that are an example of a designated word. For example, a user may restrict the results to words that correspond to "president" or "river" as shown in FIG. 6. The "Advanced Search" tab may include an input field for a user to enter a designated word that will restrict the results to words that are examples of the input word. For example, where the user inputs "river" into the input field, results display list 110 may contain such generated words as "Nile" or "Ganges."

In an example embodiment of the present invention, a user may restrict the generated words in results display list 110 to words that make up a part of some other item. For example, a user may restrict the results to words that are parts of a "bicycle" or a "face" as shown in FIG. 6. The "Advanced Search" tab may include an input field for a user to enter a word that will restrict the results to words that are parts of the input word. For example, where the user inputs "face" into the input field, results display list 110 may include such generated words as "nose," "skin," or "eyes."

As shown in FIG. 6, the "Advanced Search" tab may include a combination of such fields so that the user may cause the processor to restrict the results by a plurality of factors.

The system and method of the present invention may allow for the user to combine attributes in the advanced search function to restrict the generated results in results display list 110 based on the combined attributes. For example, a user may select to restrict the results in results display list 110 to words that are nouns and rhyme with "hair." The system and method may generate words that meet these selected attributes and return the results such as "stair," "bear," and "pear," in results display list 110 that were filtered by the selected attributes.

The above description is intended to be illustrative, and not restrictive. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A computer-implemented method for predictively looking up words in an online dictionary, the method comprising:
   executing, by a computer processor, a module that instructs the processor to respond to each new user input of a text string into a predetermined field by generating and outputting a respective initial presentation of a list of words that each contains the text string, the list of words including a first section and a second section;
   filtering the list of words according to at least a partial definition that is user-selected; and
   responsive to a user-input scroll instruction, dynamically updating the list of words to display different words of the list;
   wherein:
      the first section includes words arranged in descending order of frequency of lookup in the online dictionary;
      the second section is reserved for inclusion of words based on alphabetical proximity;
      the second section is displayed immediately below the first section; and
      the module instructs that, for each of the initial presentations of the list, the first section includes more than one word and the second section includes only one word that is alphabetically closest to the text string.

2. The method of claim 1, further comprising:
   responsive to selection of a word from the scrollable list, updating a frequency of lookup for the selected word.

3. The method of claim 1, further comprising:
   filtering the list of words according to user-selected attributes, including at least one of: part of speech, synonym, antonym, number of syllables, rhyme, prefix, at least a partial definition, hyponym, example, and meronym.

4. The method of claim 1, further comprising:
   displaying, for a most frequently looked up one of displayed words of the scrollable list, a plurality of sentences including the most frequently looked up one of the displayed words, the plurality of sentences being obtained from a plurality of media sources, and being displayed in reverse chronological order with respect to a time at which the sentences are obtained.

5. The method of claim 1, further comprising:
   displaying, for a most frequently looked up one of displayed words of the scrollable list, a plurality of sentences including the most frequently looked up one of the displayed words, the plurality of sentences being obtained from a plurality of media sources, and being displayed in reverse chronological order with respect to at least one of a date and a time associated by the media sources with the sentences.

6. The method of claim 5, wherein the sentences obtained from the media sources are included in dated articles of the media sources, the chronological order being based on the dates of the articles.

7. The method of claim 5, wherein the plurality of media sources is user-selectable and are included in accordance with respective categorizations of the sources as at least one of: news, medicine, science, business, arts, culture, sports, fiction, and technology.

8. The method of claim 1, further comprising:
   subsequent to the outputting of the scrollable list of words, receiving a character appended to the text string, forming an updated text string;
   responsive to the receipt of the appended character, dynamically updating the scrollable list to include words that contain the updated text string.

9. The method of claim 1, further comprising:
   displaying a hierarchical representation of a word family of a displayed word of the scrollable list for which a greatest look up frequency, compared to all other displayed words of the scrollable list, is recorded.

10. The method of claim 9, wherein the hierarchical representation includes a plurality of bars, one of the bars including a portion representing the displayed word for which the greatest look up frequency is selected, and each of the remaining bars including an ancestor word of the displayed word for which the greatest look up frequency is recorded, each of the ancestor words including a core text string from which the displayed word for which the greatest look up frequency is recorded, is formed.

11. The method of claim 1, further comprising responsive to a user-input add instruction, adding a word from the scrollable list of words to a word list.

12. The method of claim 1, wherein:
   at least a portion of the list remains displayed regardless of an extent of the user-input scroll instruction; and
   responsive to the user-input scroll instruction while the initial presentation is displayed, at least one word of the list is replaced by at least one other word of the list.

13. A computer-implemented method for predictively looking up words in an online dictionary, the method comprising:
   executing, by a computer processor, a module that instructs the processor to respond to each new user input of a text string into a predetermined field by generating and outputting a respective initial presentation of a list of words, wherein:
      the list includes a first section and a second section;
      each of the words of the first section is included in the list based on at least a partial definition that is user-selected and at least one of (a) the respective word being a user-selected part of speech and (b) the text string being at least one of: an antonym of the respective word, a hyponym of the respective word, an example of the respective word, and a meronym of the respective word;
      each of the words of the second section is included in the list based on alphabetical proximity to the input text string; and
      the module instructs that, for each of the initial presentations of the list, the first section includes more than one word and the second section includes only one word that is alphabetically closest to the text string.

14. The method of claim 13, wherein the words of the first section are arranged in descending order of frequency of lookup in the online dictionary.

15. The method of claim 13, wherein the respective word is included in the list based on the respective word being a user-selected part of speech.

16. The method of claim 13, wherein the respective word is included in the list based on the text string being an antonym of the respective word.

17. The method of claim 13, wherein the respective word is included in the list based on the text string being a hyponym of the respective word.

18. The method of claim 13, wherein the respective word is included in the list based on the text string being an example of the respective word.

19. The method of claim 13, wherein the respective word is included in the list based on the text string being a meronym of the respective word.

20. A computer-implemented method for predictively looking up words in an online dictionary, the method comprising:
 executing, by a computer processor, a module that instructs the processor to respond to each new user input of a text string into a predetermined field by generating and outputting a respective initial presentation of a list of words that each contains the text string, the list of words including a first section and a second section;
 filtering the list of words according to at least a partial definition that is user-selected; and
 responsive to a user-input scroll instruction, dynamically updating the list of words to display different words of the list;
 wherein:
  the first section includes words arranged in descending order of frequency of lookup in the online dictionary;
  the second section is reserved for inclusion of words with a closest alphabetical proximity to the text string;
  the second section is displayed immediately below the first section; and
  the module instructs that, for each of the initial presentations of the list, the first section includes more words than the second section.

21. The method of claim 20, wherein:
 at least a portion of the second section remains displayed regardless of an extent of the user-input scroll instruction; and
 responsive to the user-input scroll instruction while the initial presentation is displayed, at least one word of the first section is replaced by at least one of the additional words included in the list based on the descending order of frequency of lookup in the online dictionary.

\* \* \* \* \*